United States Patent [19]
Mukhopadhyay et al.

[11] Patent Number: 6,032,158
[45] Date of Patent: Feb. 29, 2000

[54] APPARATUS AND METHOD FOR CAPTURING AND PROPAGATING CHANGES FROM AN OPERATIONAL DATABASE TO DATA MARTS

[75] Inventors: Pinaki Mukhopadhyay, Sunnyvale; Diaz Nesamoney, San Francisco; Mohan Sankaran, Hayward; Sankaran Suresh; Sanjeev K. Gupta, both of Sunnyvale, all of Calif.

[73] Assignee: Informatica Corporation, Menlo Park, Calif.

[21] Appl. No.: 08/850,490

[22] Filed: May 2, 1997

[51] Int. Cl.[7] .................................................. G06F 17/30
[52] U.S. Cl. ............................................. 707/201; 707/10
[58] Field of Search ........................... 707/101, 201–204, 707/10

[56] References Cited

U.S. PATENT DOCUMENTS

| | | | |
|---|---|---|---|
| 5,603,024 | 2/1997 | Goldring | 707/203 |
| 5,675,785 | 10/1997 | Hall et al. | 707/102 |
| 5,781,911 | 7/1998 | Young et al. | 707/201 |
| 5,787,415 | 7/1998 | Jacobson et al. | 707/2 |

OTHER PUBLICATIONS

Chan, R. "12 Steps of Creating a Successful Data Warehouse." Proceedings of the 8th International Database Workshop (Industrial Volume), Proceedings of the 8th International Hong Kong Computer Society Database Workshop. Data Mining, Data Warehousing and CLI, pp.227–248, XP002074804. ISBN 981–3083–53–0, 1997, Singapore, Springer-Verlag Singapore, Singapore.

Anand, V. J. et al. "Data Warehouse Architecture for DDS Applications." *Australian Journal of Information Systems.* Sep. 1996, AJIS Publishing, Australia, vol. 4, No. 1, pp. 43–53, XP002074805 ISSN 10399–7841.

Weyman, P. J. "The Case for a Process–Driven Approach to Data Warehousing." *Database and Network Journal*, Feb. 1997, A. P. Publications, UK, vol. 27, No. 1, pp. 3–6, XP002074806, ISSN 0265–4490.

Mumick I. S. et al. "Maintenance of Data Cubes and Summary Tables in a Warehouse." SIGMOD 1997. ACM SIGMOD International Conference on Management of Data, Tucson, AZ, USA, 13–15, May 1997, vol. 26, No. 2, pp. 100–111, XP002074807, ISSN 0163–5808, SIGMOD Record, Jun. 1997, ACM, USA.

Curley, K. et al. "The Rationale for Developing a Corporate Data Warehouse Environment." OOIS '95. 1995 International Conference on Object Oriented Information Systems Proceedings, Proceedings of 1995, International Conference on Object Oriented Infromation Systems, Dublin, Ireland, Dec. 18–20, 1995, pp. 351–366, XP002074808, ISBN 3–540–76010–5, 1996, Berlin Gemany, Springer–Verlag, Germany.

*Primary Examiner*—Maria N. Vonbuhr
*Attorney, Agent, or Firm*—Wagner, Murabito & Hao LLP

[57] ABSTRACT

A method for updating a target table of a data mart in response to changes made by a transaction to data stored in a source table of an operational database. Data that was changed in the source table by the transaction is stored in a dynamic image table of a change capture database. Data that was not changed in the source table by the transaction, but which is nevertheless required to be mapped to the target table, is stored in a static image table of the change capture database. The change capture database also contains relevant information regarding the transaction. Once the dynamic and static image tables are properly staged, the changes are propagated from the change capture database to the target tables of the data marts. In other words, data is extracted from the change capture database and subsequently transformed and loaded, thereby minimizing the impact to the operational database. Thereupon, the tables of the change capture database are truncated to discard data which is now no longer needed.

18 Claims, 8 Drawing Sheets

APPARATUS AND METHOD FOR CAPTURING AND PROPAGATING CHANGES FROM AN OPERATIONAL DATABASE TO DATA MARTS

FIELD OF THE INVENTION

The present invention relates to database systems. More particularly, the present invention pertains to an apparatus and method for efficiently capturing and propagating changes made upon an operational database to one or more target datamarts with minimal impact on the operational database.

BACKGROUND OF THE INVENTION

Due to the increased amounts of data being stored and processed today, operational databases are constructed, categorized, and formatted in a manner conducive for maximum throughput, access time, and storage capacity. Unfortunately, the raw data found in these operational databases often exist as rows and columns of numbers and code which appears bewildering and incomprehensible to business analysts and decision makers. Furthermore, the scope and vastness of the raw data stored in modern databases renders it harder to analyze. Hence, applications were developed in an effort to help interpret, analyze, and compile the data so that it may be readily and easily understood by a business analyst. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data is structured to satisfy decision support roles rather than operational needs. Before the data is loaded into the data warehouse or data mart, the corresponding source data from an operational database is filtered to remove extraneous and erroneous records; cryptic and conflicting codes are resolved; raw data is translated into something more meaningful; and summary data that is useful for decision support, trend analysis or other end-user needs is pre-calculated. In the end, the data warehouse is comprised of an analytical database containing data useful for decision support. A data mart is similar to a data warehouse, except that it contains a subset of corporate data for a single aspect of business, such as finance, sales, inventory, or human resources. With data warehouses and data marts, useful information is retained at the disposal of the decision makers.

One of the problems associated with implementing data warehouses and data marts relates to keeping them synchronized with the changes occurring in the operational databases. Given the size and scope of the operational databases and given that there might exist numerous operational databases and many different types of datamarts, it is a monumental task for incorporating, synchronizing, and updating the changes made to an operational database so that they are appropriately reflected in the data warehouses and data marts. Furthermore, new data may be entered from many different discrete or overlapping sources. In addition, old data may be updated on a continuous or regular basis.

In the past, data warehouses and data marts were updated and maintained by reprocessing and transforming the entire data set, even though only a small portion of the operational database was actually changed. This brute-force approach of reprocessing each and every data entry is tedious, time-consuming, and highly inefficient. Alternatively, some prior art system first performed a scanning operation. The entire data set was scanned to determine whether the data is new, updated, or current. Based on the scan results, the data in the data warehouses and data marts were changed accordingly. Although this approach is slightly faster, it nevertheless is still relatively time-consuming to examine and process each and every data item. It also significantly slows down the operational database.

It is often crucial that the most recent information be made available to key individuals so that they can render informed decisions as promptly as possible. Thus, there is a need for a more efficient and faster method for responding to changes made upon an operational database and incorporating these changes to the respective data warehouses and data marts. The present invention offers a solution whereby only the changes to the operational database are captured and propagated to the data warehouses and data marts. This is made possible by the creation of a novel "Change Capture" database (CCDB) used in conjunction with a "Change Data Capture" (CDC) process to facilitate the capturing of changes and the updating and propagation of these changes to the appropriate data warehouses and data marts.

SUMMARY OF THE INVENTION

The present invention pertains to an apparatus and method for efficiently capturing and propagating changes made upon the source tables of an operational database to one or more target tables of data marts, whereby the impact to the operational database is minimized. Each source table contained within the operational database has a corresponding dynamic image table and a static image table, which are stored as part of a change capture database. The dynamic image tables are used to store actual changes made to their respective source tables as part of a transaction. The static image tables are used to store relevant historical data (e.g., old data that has not been changed by that transaction) corresponding to their respective source tables. The rationale behind implementing static image tables is to accommodate multiple mappings whereby the contents of one source table may be mapped to multiple target tables. Often, historical data is necessary in order to properly execute the changes rendered by the transaction.

In the currently preferred embodiment, a change capture process is used to determine which source tables have been changed and the actual changes made to those source tables. The actual changes are then staged in the dynamic image tables. When the transaction rendering these changes is committed, a builder process is notified. It is the function of the builder process to ensure that the correct data is staged in the dynamic and static image tables. Thereupon, the data is extracted from the dynamic and static image tables, transformed, and loaded into the appropriate target tables. Afterwards, a truncator process discards the data in the dynamic and static image tables that are now no longer needed. Thus, in the present invention, the extraction, transformation, and loading process accesses only the change capture database without impacting the operational database.

BRIEF DESCRIPTION OF THE DRAWINGS

The operation of this invention can be best visualized by reference to the drawings.

DETAILED DESCRIPTION

An apparatus and method for capturing and propagating changes made upon an operational database to one or more target datamarts is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. Furthermore, the use of the term data mart hereinafter includes data warehousing and other related database structures and organizations.

Figure 1:
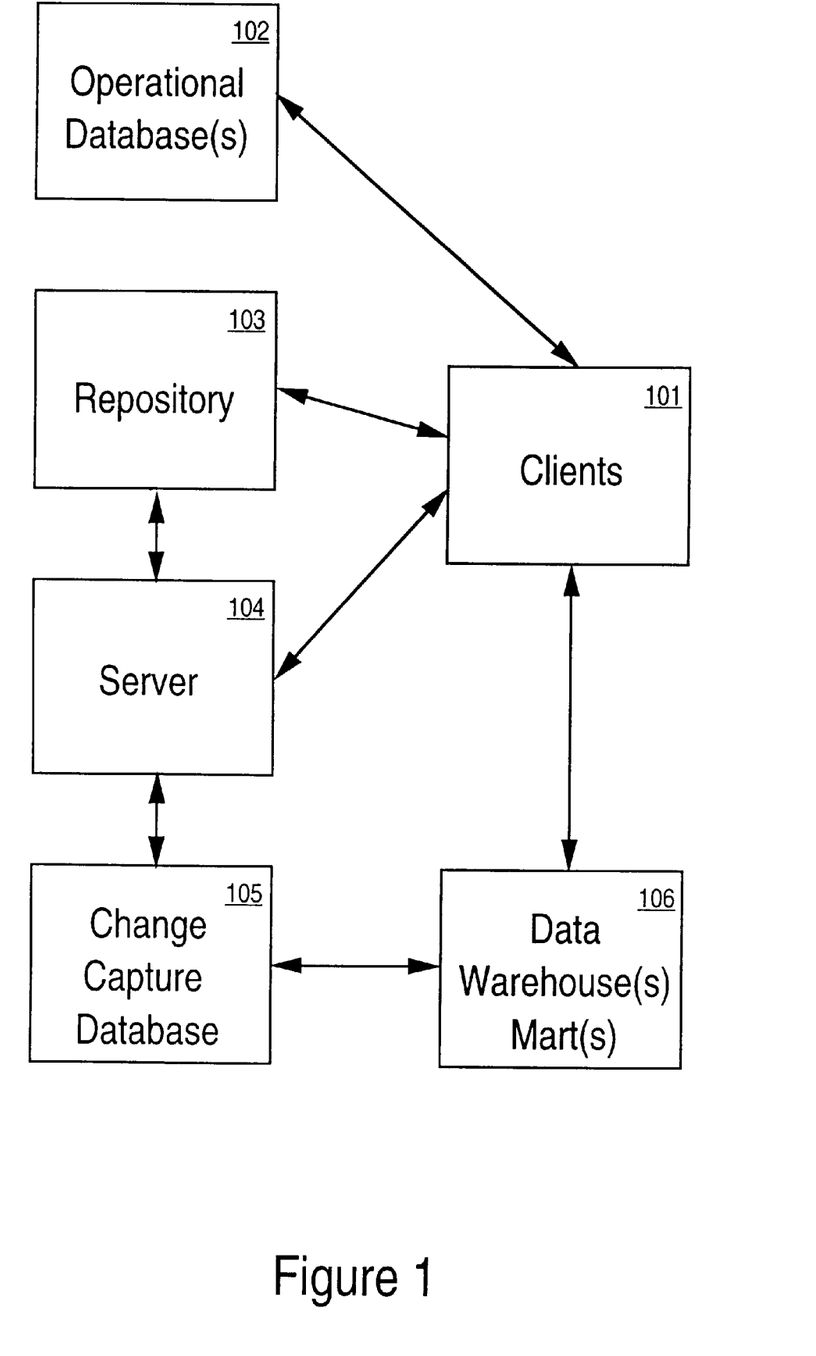
FIG. 1 is a block diagram describing a typical computer system upon which the present invention may be practiced.

FIG. 1 is a diagram describing a typical computer system upon which the present invention may be practiced The system may incorporate a number of clients 101 (e.g., personal computers, workstations, portable computers, minicomputers, terminals, etc.), upon which various client processes are used to perform desired tasks (e.g., inventory control, payroll, billing, etc.). Data is stored in one or more operational databases 102 (e.g., any of the conventional RDMS systems from Oracle, Informix, Sybase, Microsoft, etc.) residing within a high capacity mass storage device (e.g., hard disk drives, optical drives, tape drives, etc.). Data relating to operational databases 104 can be entered, updated, and retrieved by clients 101–103. A client 101 is used to create a repository 103, which is used to keep track of session information as well as mapping information relating to how data is to be mapped and transformed from target tables of the operational databases 102 to target tables of data marts 106. Changes and historical data from operational databases 102 are entered into change capture database 105. The target databases of data marts 106 are synchronized with changes made to the operational databases 102 through the change capture database 105. It would be appreciated by those with ordinary skill in the art that the present invention may be practiced in any number of different hardware configurations.

Figure 2:
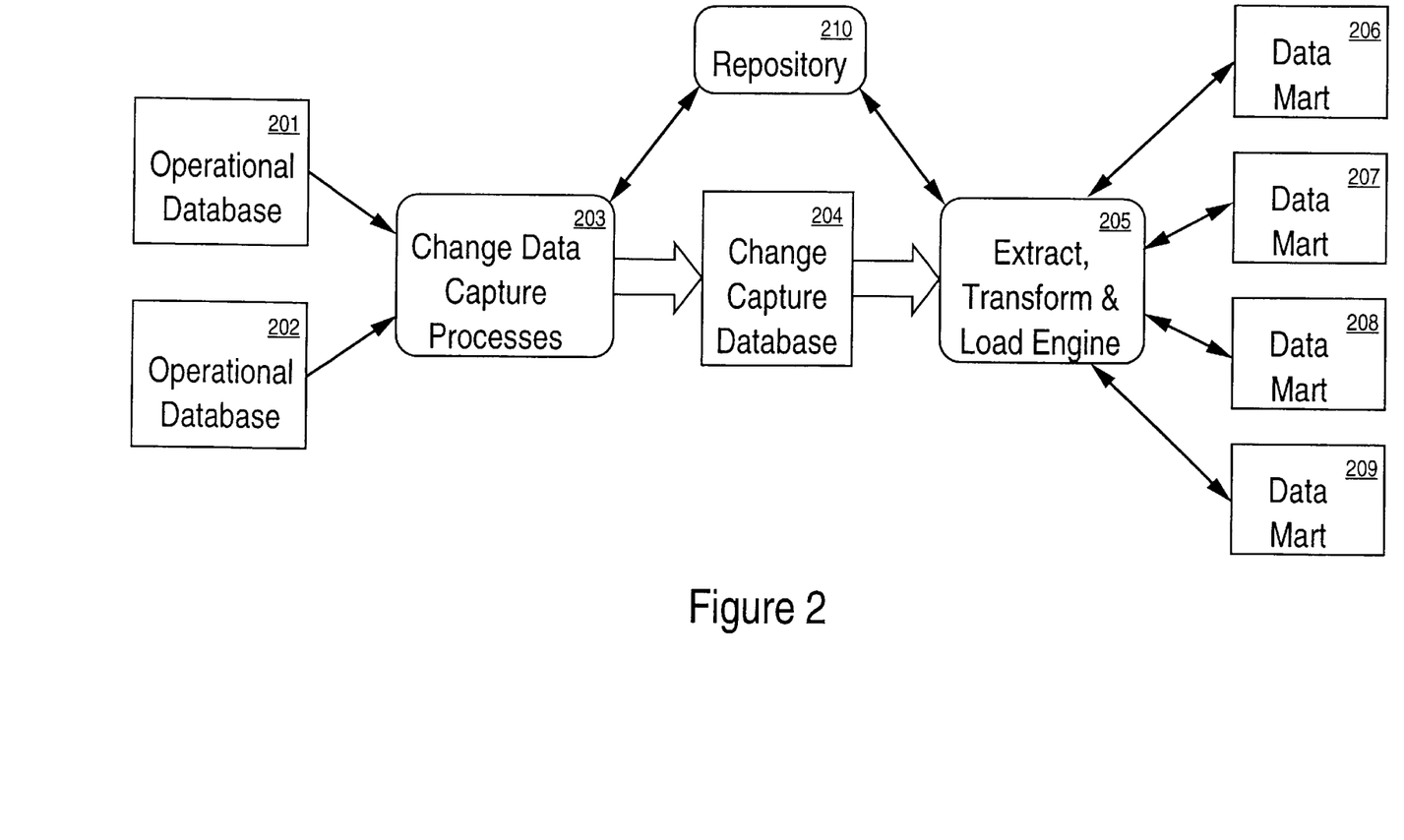
FIG. 2 is a diagram showing how a change data capture process is used in conjunction with a change capture database, and an extract, transform, and load process to synchronize data marts with changes made to operational databases.

Referring to FIG. 2, a change data capture process 203 is used in conjunction with a dedicated database, referred hereinafter as the "Change Capture" database (CCDB) 204, and an extract, transform, and load process 205 to synchronize data marts 206–209 with changes made to the operational databases 201. Raw data is stored in tables residing within one or more source operational databases 201–202. Anytime a new entry is entered or an old entry is updated, the changes are captured and staged in a dedicated CCDB database 204. The extraction, transformation, and loading process 205 then propagates the changes to the appropriate data marts 206–209 based on the contents of the CCDB 204. The standard extraction, transformation, and loading process is well-known in the data mart field (e.g., Powermart Server™ by Informatica). A repository 210 is used to store the requisite session and mapping information used by the extracting, transformation, and loading process 205; repository 210 also contains information regarding what data should be captured from the source tables of the operational databases 201–202.

Thereby, the data marts 206–209 can be incrementally refreshed with changes occurring in the operational system, either as they occur (for critical real-time warehousing) or on a scheduled basis. By extracting and propagating only the changes that have occurred to the operational sources, significant time, computational, and throughput savings can be achieved by the present invention. For example, given an operational sale table that contains one million records and which grows at a rate of 10,000 records a week, if a complete refresh of the warehouse table were done on a weekly basis, 1,010,000 records would need to be processed and propagated into the warehouse after the first week by a typical prior art method. However, with the present change data capture invention, only 10,000 records would be processed and propagated into the data marts. By referencing the change capture database rather than the operational databases, the present invention also significantly reduces the impact on the operational databases. Note that it may be possible to determine what has changed in the operational database in all possible cases without using elaborate timestamping and associated application logic. However, this may require re-designing the operational tables to contain a time stamp field. Redesigning the operational table may not be acceptable. Moreover, in certain cases, without timestamp information, it may be impossible to determine what has changed in the operational database.

Figure 3:
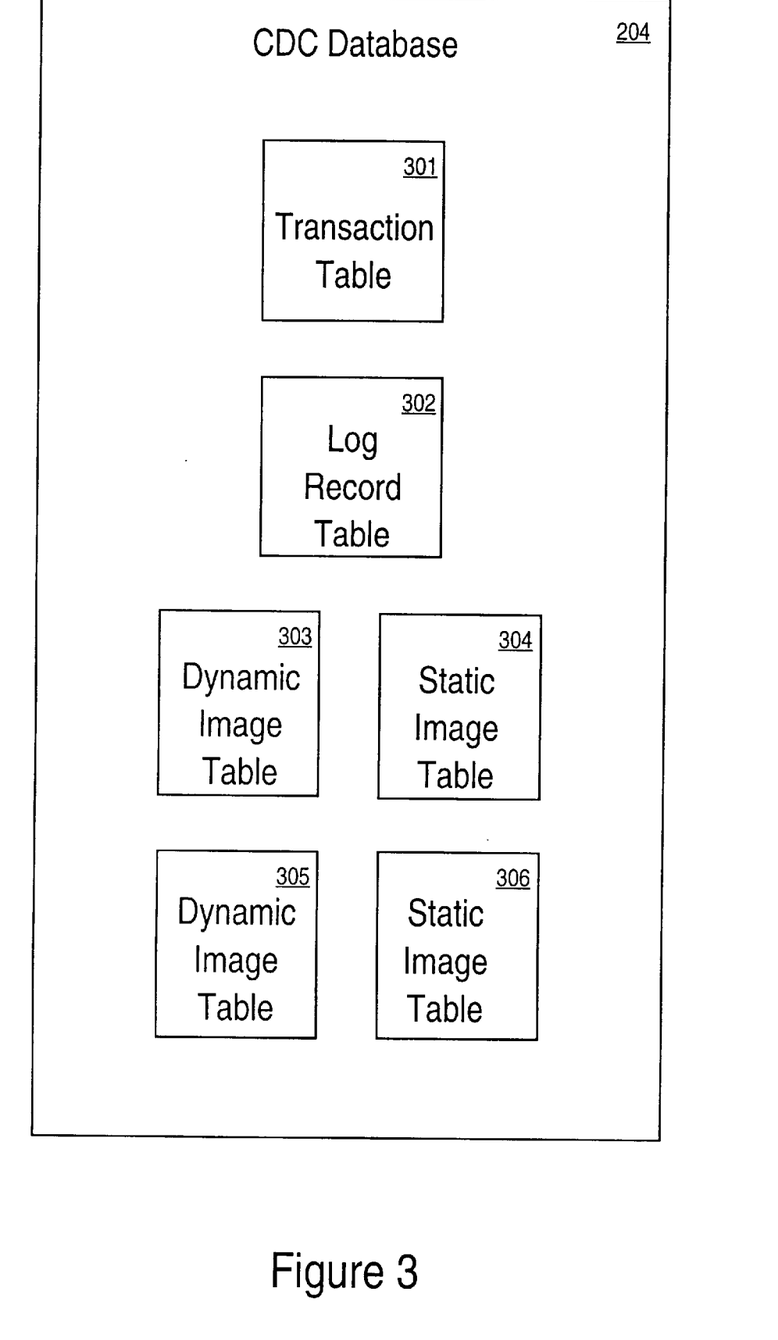
FIG. 3 shows a detailed diagram of the change data capture database.

The method by which the CDC process capture and stage changes into the CDC database is now described. Referring to FIG. 3, a more detailed diagram of the change data capture database is shown The CDC database 204 is comprised of a transaction table 301, a log record table 302, and one or more image tables 303–306. The CDC process allow the user to use two or more mapping. This is accomplished by capturing changes on the source tables that are used in that mapping. The user designates one source table in the mapping to be the primary source table. The primary source table is a unique table for a single target table whose content provides a closure for the content of that target table. In other words, the changes in the primary source table drive the change propagation for a given target table. The remaining source tables in the mapping are designated as non-primary source tables. To load the changes in a given target table, the extract, transform, and load process uses the dynamic image table of the primary source table and the static image tables of the non-primary source tables.

The transaction table 301 and log record table 302 are used to track the on-going transactions that occurred in the source tables, the state of these transactions, and the changes to the source tables modified by these transactions. More specifically, the transaction table 301 contains the following information: the server and the database corresponding to where the transaction initiated; the identification (id) of the transaction in the operational database; the id of the transaction by which the CDC processes identify the transaction; the identifications of the first and last log records in the transaction chain; the time when the transaction started in the operational database; the time when the transaction was resolved in the operational database; and the state of the transaction (e.g., committed, aborted, etc.). Table 1 below shows the fields associated with an exemplary transaction table.

TABLE 1

| DB_SERVER_ID | NUMBER | //The unique id of the operational //database. //Also known as the instance id. |
|---|---|---|
| X_TID | VARCHAR(57) | //The external transaction id (from //the operational database |
| I_TID_HIGH | NUMBER | //The high word of the internal //transaction id |
| I_TID_LOW | NUMBER | //The low word of the internal //transaction id |
| START_LSN | VARCHAR(65) | //The lsn of the begin transaction //log record |
| END_LSN | VARCHAR(65) | //The of the commit transaction log //record |
| BEGIN_TIME | DATETIME | //The time when the transaction //started |
| END_TIME | DATETIME | //The time when the transaction //resolved |
| TRAN_STATE | NUMBER | //The state of the transaction //1→started //2→committed for image builder //3→committed for pmserver |

The server and database id's are used to separate change data streams coming from multiple different operational databases into the same CDC database. The transaction id is a unique number that is assigned internally for preserving the transaction order when changes are propagated to the target data mart. The id of the first log record and the last log record are kept with every transaction. The log record id's are commonly referred to as log sequence numbers (LSNs). They are used to handle rollback commands as may be generated by the operational database. The transaction begin and resolve times are maintained with every transaction in order to support a change propagation based on a time filter (e.g., "Get all changes as of Sunday, 12:00 p.m."). Lastly, the transaction state tracks whether the transaction commits or aborts. This ensures that changes from uncommitted transactions will never be propagated to the target data mart.

The log record table 302 contains the unique id of the operational database; the internal transaction id; the source table id; and the dynamic image table name of the source table. Table 2 below shows the fields for an exemplary log record table.

TABLE 2

| DB_SERVER_ID | NUMBER | //The unique id of the //operational database. //Also known as the //instance id. |
|---|---|---|
| I_TID_HIGH | NUMBER | //The high word in the //transaction id |
| I_TID_LOW | NUMBER | //The low word in the //transaction id |
| SOURCE_TABLE_ID | NUMBER | //The source table id |
| IMAGE_TABLE | VARCHAR(20) | //The dynamic image table //name of the source table. |

The actual changes to the source tables of an operational database are stored in one or more image tables 303–306. For every source table in an operational database from which changes are to be captured, two image tables (one dynamic and one static) are created and maintained inside the CDC database 204. For example, FIG. 3 shows two sets of image tables (303–304 and 305–306). Dynamic image table 303 and static image table 304 correspond to one source table, whereas dynamic image table 305 an static image table 306 correspond to another, second source table. Image tables 303–306 are identical to the source tables, except that they contain additional information used by the CDC process. Dynamic image tables 303 and 305 are used to store the actual changes made to their corresponding operational source tables. Additionally, dynamic image tables 303 and 305 contain the following information: the internal transaction id that made the change; the LSN of the log record containing the change; a flag indicating whether the changed value (e.g., the row value) in the operational table is before the change took place or after the change took place; and a flag indicating whether the change in the operational table was an insert, delete or update row. Table 3 below shows the fields of an exemplary dynamic image table.

TABLE 3

| OPB_I_TID_HIGH | NUMBER | //The high word of the //internal transaction id |
|---|---|---|
| OPB_I_TID_LOW | NUMBER | //The low word of the //internal transaction id |
| OPB_I_LSN | VARCHAR(65) | //The log sequence num- //ber of the log record |
| OPB_CC_IS_B4_IMG | NUMBER | //Flag indicating if value //in the row is the value //before the change or //after the change. //1→before image value //0→after image value |
| OPB_CC_ROW_TYPE | NUMBER | //The type of the log //record //4→insert log record //5→delete log record //6→update log record |

The internal transaction id from the dynamic image table is used to sequence the transaction in accordance with their original order in the operational database. This ensures data consistency in the target tables after the changes are loaded in the target tables. The LSN from the dynamic image table is used to sequence multiple changes within a transaction and to preserve the data consistency in the target tables. The CDC process also allow changes from insert, delete or updates to be captured and propagated to the target data mart. Hence, every row in the dynamic image table is tagged by the type of change. This allows the extracting, transform, and load process to take appropriate actions in the target table when propagating the changes. When applying the changes from an update operation the engine removes the effect of the before image value and applies the after image value. Consequently, when the change type is update, the dynamic image table contains two rows—one row for the before image and one row for the after image.

In contrast, static image tables 304 and 306 are used to store the historical information from their corresponding operational source tables. Such historical information is needed by the extracting, transform and load process to join the changes with historical data. The internal transaction id is also contained in the static image tables. The contents of the static image tables must be synchronized with that of the operational tables. When rows are deleted from the operational source table, the change is recorded in the dynamic image tables. However, that row cannot be deleted from the static image table until all the changes that occurred before the delete are processed. In implementation, the transaction id in the static image table is set to the transaction id of the transaction that deleted the row from the operational tables.

If the same row is inserted in the operational database, the transaction id is set to zero. Otherwise, when all the changes prior to the delete are processed, the row with the non-zero transaction id is deleted from the static image table. The main reason to maintain the static image tables 304 and 306 is to reduce the impact on the operational database. The content of the static image tables are used to join with zero or more static image tables and exactly one dynamic image table. The capture process pulls historical data from the operational database. This happens when a change occurs to a primary source table and the associated data in the static image table of non-primary source table is not present.

An in-memory queue (within the extract, transform, and load process) of in-flight transactions is maintained to improve the throughput of the system. When a transaction starts (e.g., a log record describing a new transaction is started), this information is recorded in the transaction table as well as in the in-memory queue of in-flight transactions. Upon receiving a change (e.g., a log record describing the change), the in-memory queue is consulted. If the table modified by this transaction is already present in the transaction queue (e.g., already being modified by the same transaction), then no row is added to the log record. Otherwise, the in-memory queue as well as the log record table is updated to record the table being modified by the transaction. When the transaction is resolved, the entry is removed from the in-memory queue. All transaction related lookup are performed on the in-memory queue. Thereby, a lookup in the database table is not necessary. Each element in the in-memory queue contains the following information: external transaction id, internal transaction id, source table id, dynamic image table id, and the transaction begin time.

Figure 4:
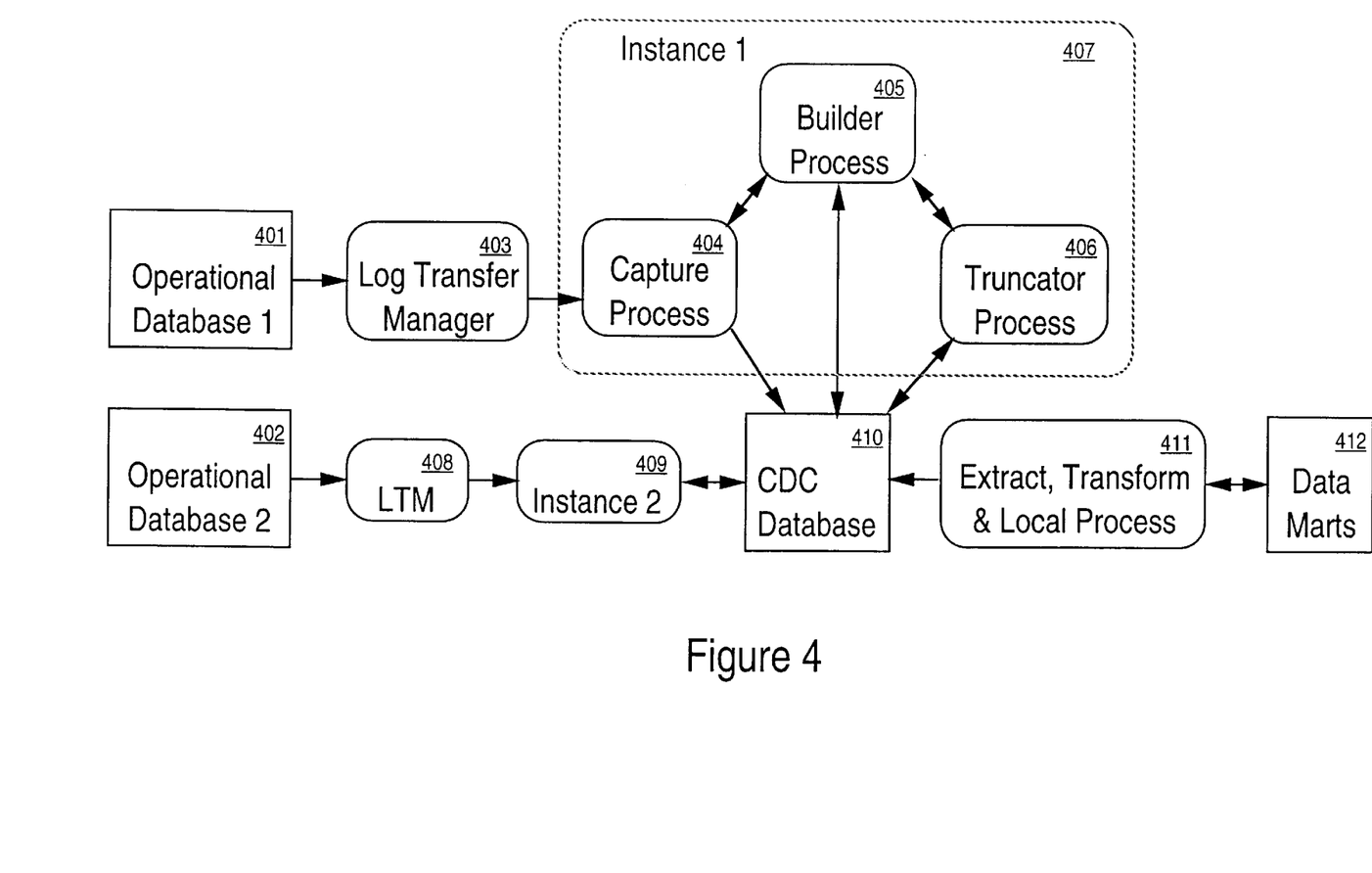
FIG. 4 shows a diagram describing the interactions of the change data capture process.

The functions of the CDC process are now described. Referring to FIG. 4, a diagram showing the interactions of the CDC process is shown. Two operational databases 401 and 402 are shown. A log transfer manager 403 scans the server log and forwards the changes of operational database 401 to the capture process. The capture process 404 is responsible for determining the source table that has been modified and the actual changes that had occurred in that particular source table. The changes are then staged in the dynamic image tables of CDC database 410. When the transaction responsible for the changes in the operational table is committed, the capture process 403 marks all the changes made by the transaction ready for the builder process 405. Thereupon, capture process 406 notifies builder process 405 to process these changes.

Builder process 405 only processes the changes corresponding to those transactions which have been committed in the operational database. Upon finding the changes in the dynamic image table belonging to the committed transaction, builder process 405 ensures that the related data in the static image tables of all non-primary source tables is present. If the related data is not present, such data will be pulled out from the operational database and stored in the static image table. The list of such non-primary source tables is determined by inspecting every mapping in which the source table is used as a primary source table. If the source table whose changes are found in the dynamic image table is also used as a non-primary source table in other mappings, then the builder process 405 folds the changes in from the dynamic image table to its static image table. If the table which changed is only used as a non-primary source, then the changes are folded from the dynamic to static image tables, and the changes are then removed from the dynamic table. At this point, the changes are ready to be propagated to the target data marts 412 via extract, transform, and load process 411.

After the staged data from the image tables are moved into the target data marts 412, such data is no longer needed to be present in the CDC database 410. It is the function of truncator process 406 to determine the lowest water mark points of change propagations to the target data marts 412. The dynamic image tables, static image tables, transaction table, and log record table are then truncated (e.g., records discarded) accordingly.

The CDC process is itself, comprised of three separate processes: capture process 404, builder process 405, and truncator process 406. These processes is known as an instance 407. Another similar instance 409 may be utilized to work with a second operational database 402 via LTM 408. Thereby, changes to operational database 402 are also staged and stored onto the same CDC database 410. Eventually, these changes are propagated to the appropriate data marts 412 through the extract, transform, and load process 411.

Figure 5:
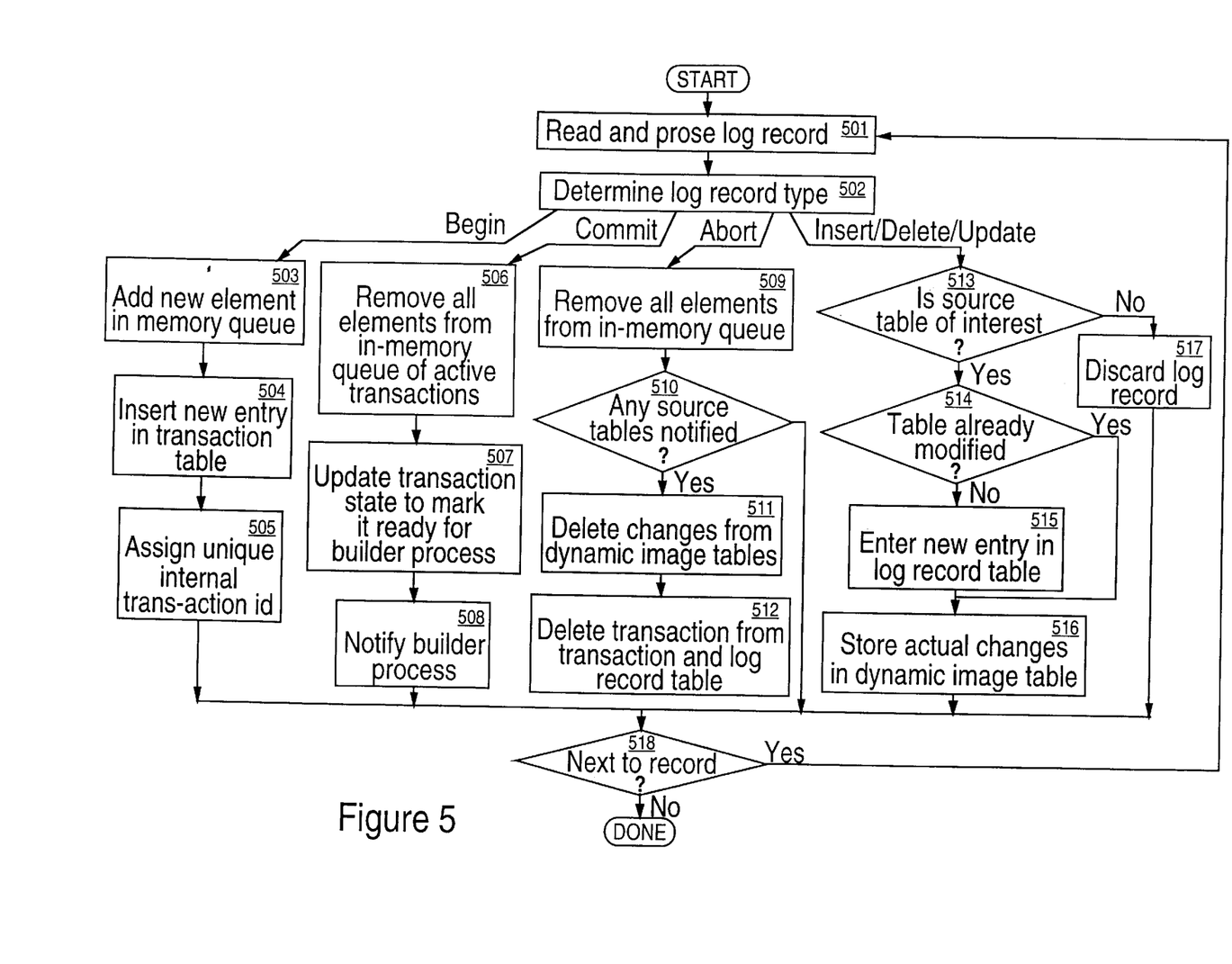
FIG. 5 is a flowchart showing the steps for performing the capture process.

Each of these three different processes are now described in detail. First, the steps for performing the capture process are described in detail as shown by the flowchart of FIG. 5. Initially, the capture process receives incoming log records from the log transfer manager and parses each log record to determine whether the particular log record is of any interest to the CDC system, step 501. Next, in step 502, the log record's transaction type is determined. If the log record indicates a begin transaction, a new element in added in the memory queue, step 503. In addition, a new entry is inserted in the transaction table, step 504. A unique internal transaction id is then assigned to the external transaction that was received from the LTM, step 505. If the log record indicates a commit transaction, then all the elements from the in-memory queue of active transactions are removed, step 506. The transaction state in the transaction table is then updated so that the builder process can know when it can start processing the changes, steps 507 and 508. If the log record indicates an abort transaction, all in-memory queue elements belonging to this transaction are removed first, step 509. A determination is then made in step 510 as to whether the transaction modified any source tables. If a source table was modified, the changes are deleted from the dynamic image tables, step 511, and the entry of this transaction is deleted from the transaction and log record tables, step 512. However, if the log record indicates either an insert, delete, or update transaction, a determination is made in step 513 as to whether the source table is of any interest. If the log record does not change any source table in any mapping associated with the instance, then the log record is deemed of no interest, and it is discarded, step 517. Otherwise, the log record is stored in the log record table and in a specific dynamic image table. Thereupon, a determination is made in step 514 as to whether the table has already been modified by this transaction. If it has not yet been modified, a new entry is added in the log record table, step 515. The actual changes corresponding to the source table are stored in the dynamic image table, step 516. Step 518 determines whether another log record is received. For each subsequent log record, the process is repeated starting with step 501.

Figure 6:
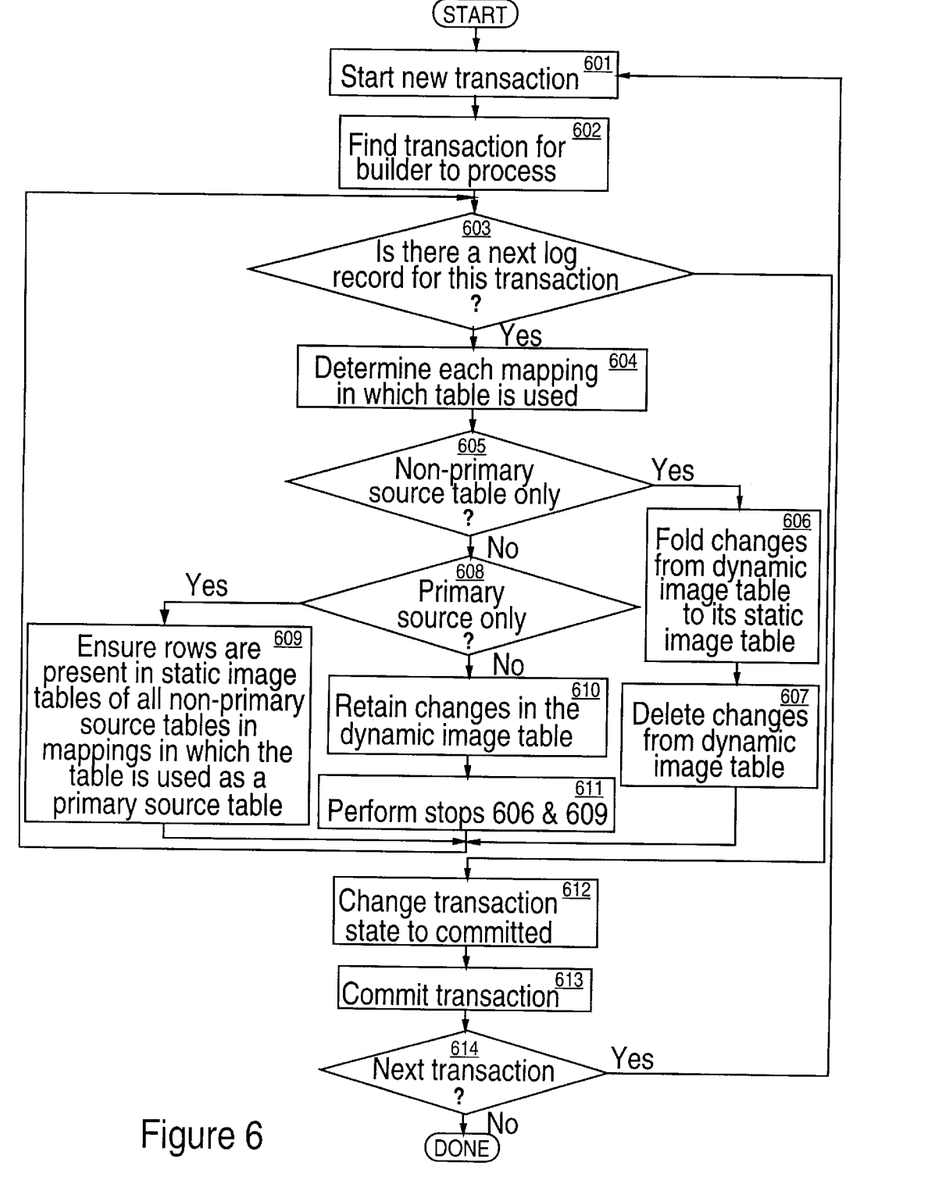
FIG. 6 is a flowchart showing the steps for performing the builder process.

The builder process is now described in detail. Basically, the capture process initiates the builder process when there is data for the builder to process. Once the builder process is initialized, it reads a transaction form the transaction table that has been marked for processing by the builder. It also determines the list of source tables and dynamic image tables modified by this transaction. Processing the log records belonging to a transaction originating at the source database according to the builder process is shown in the flowchart of FIG. 6. In step 601, a new transaction is started. The transaction and log record tables are consulted to find a transaction which is ready for the builder to start its process on, step 602. For the entire data corresponding to that particular transaction, the following steps are performed. In step 603, a determination is made as to whether there is a next log record belonging to this transaction. If there are more log records for this transaction, step 604 is performed. Otherwise, the process skips to step 612. In step 604, the mapping is determined in which the table is used. Thereupon, if the table is used only as a non-primary source table in any mapping, the changes are folded from the dynamic image table to its static image table, and the changes are deleted from the dynamic image table, steps 605–607. Otherwise, if the table is used as a primary source table, then it is ensured that the associated rows are present in the static image tables of all non-primary source tables in mappings in which the table is used as a primary source table, steps 608–609. If the data does not yet exist in the static tables, it is pulled out from the operational database. If, however, the table is used as both a primary source as sell as a non-primary source table, the changes are retained in the dynamic image table (step 610) and steps 606 and 609 are performed (step 611). The process then repeats, starting at step 603 again. If step 603 determines that there are no more log records belonging to this transaction, then the transaction state is changed to "committed" and the transaction is then actually committed, steps 612 and 613. If there is a new transaction, as determined by step 614, then the builder process repeats, starting with step 601.

The truncator process is now described in detail. The truncator process only truncates data that has already been moved to the target data mart by the extract, transform, and load process and which no longer needs to be present in the Change Capture Database. The information on how much data (changes) has been propagated to various target tables are kept in a recovery table as part of the repository. An exemplary recovery table is shown below in Table 4.

TABLE 4

| SESSION_ID | NUMBER | //Id of the session pumping data //to the target table |
|---|---|---|
| SUBSCRIBER_ID | NUMBER | //unused |
| MAPPING_ID | NUMBER | //mapping id of the session |
| TARGET_ID | NUMBER | //target table id in which the //changes are pumped |
| IS_CC_SESSION | NUMBER | //flag indicating if this is a cc //session |
| LAST_TIMESTAMP | DATETIME | //timestamp of the last changes //made into the target |
| RECOVER_FROM | NUMBER | //used only for non-CC session |
| I_HIGH_TTD | NUMBER | //the tid of the last change made //into the target |
| I_LOW_TID | NUMBER | //the tid of the last change made //into the target |

Figure 7:
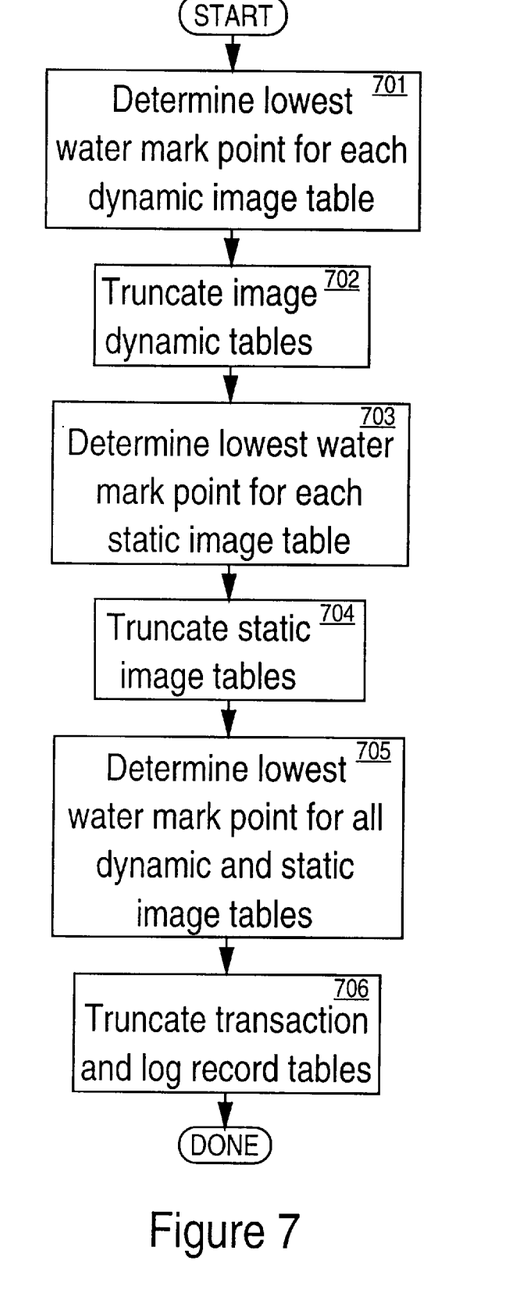
FIG. 7 is a flowchart describing the steps for performing the truncation process.

The truncator process uses this information to determine the truncation points for the various dynamic and static image tables, the log record table, and the transaction table. FIG. 7 is a flowchart describing the steps for performing the truncation process. Initially, the recovery table is read to determine the lowest water mark point for each dynamic image table, step 701. The lowest water mark point for a dynamic image table is the lowest internal transaction id amongst all target tables which use the source table as the primary source. In other words, the truncator determines all target tables that use this particular table as a primary source. The minimum propagation point among all the target tables is the lowest water mark point for this dynamic image table. Thereupon, all changes up to and including this lowest water mark, are discarded from the dynamic image table, step 702. A similar technique is also used to truncate the static image tables. For a static image table, the lowest water mark point is determined in step 703 by finding the lowest internal transaction id amongst all target tables which use this source table as a non-pnmary source. In other words, the truncator process determines all target tables that use this source table as a non-primary source. The minimum propagation point among all these target tables is designated as the lowest water mark point for the static image table. All data having an internal transaction id less than the lowest water mark point is discarded, step 704. Next, in step 705, the lowest water mark point amongst all dynamic and static image tables is then computed. The transaction table and log record tables are then truncated at this new lowest water mark, step 706.

Figure 8:
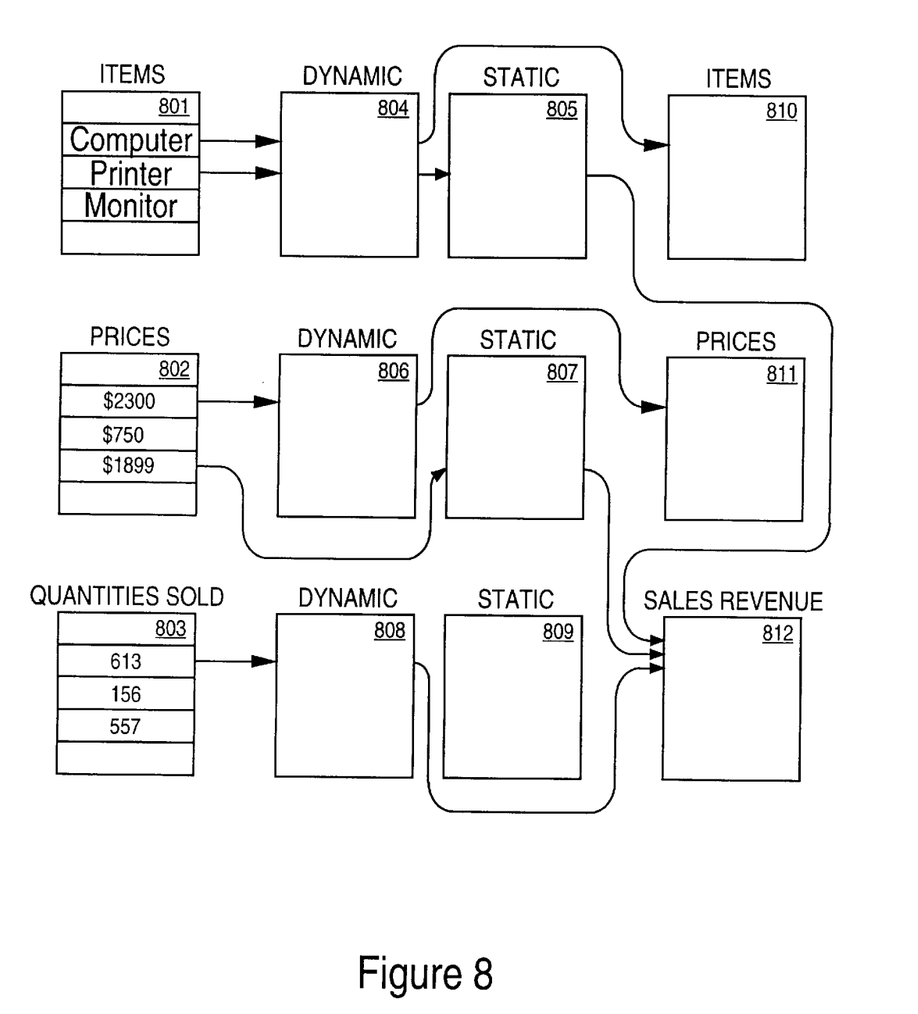
FIG. 8 shows an example of how changes are mapped from source tables of an operational database to target tables of a data mart via the dynamic and static image tables of a change capture database.

FIG. 8 shows an example of how changes are mapped from source tables of an operational database to target tables of a data mart via the dynamic and static image tables of a change capture database. Three source tables are shown for storing data relating to ITEMS 801, PRICES 802, and QUANTITES SOLD 803. Each of these source tables has a corresponding set of dynamic and static image tables. For example, source table 801 has an associated dynamic image table 804 and static image table 805; source table 802 has dynamic image table 806 and static image table 807; and source table 803 has dynamic image table 808 and static image table 809. Three target tables are shown as ITEMS table 810, PRICES table 811, and Sales$_{13}$ REVENUE table 812. In this example, suppose that ITEMS source table 801 is designated as being the primary source for ITEMS target table 810. Hence, any changes to the data in source table 801 are captured and staged into dynamic image table 804. The actual changed data is then propagated from dynamic image table 804 to the target ITEMS table 810. Similarly, the PRICES source table 802 is designated as being the primary source for the PRICES target table 811. Likewise, any changes to the prices in source table 802 are captured and staged into dynamic image table 806. When the transaction commits, the changes in dynamic image table 806 are propagated to the target table 811. However, for the SALES_REVENUE target table 812, the QUANTITIES SOLD source table 803 is designated as the primary source. But since items and prices data are mapped onto the SALES_REVENUE target table 812 (in order to calculate sales information), the ITEMS source table 801 and PRICES source table 802 are designated as being non-primary sources. Consequently, data from static image table 805, static image table 807, and dynamic image table 808 are propagated to target SALES_REVENUE table 812.

Subsequently, if a change is made to an entry in the ITEMS source table 801, the change is staged in dynamic image table 804. The actual updated, changed data is written from dynamic image table 804 to static image table 805 and then propagated to SALES_REVENUE table 812. If, however, the requisite price data does not currently reside within static image table 807, the data (historical and unchanged) is read from the PRICES source table 802 and stored in static image table 807. From static image table 807, the requisite data is then propagated to the SALES_REVENUE target table 812. Changes to the QUANTITIES SOLD source table 803 are captured and staged in dynamic image table 808 and eventually propagated to SALES_REVENUE table 812.

Hence, an apparatus and method for efficiently capturing and propagating changes made upon an operational database to one or more target datamarts with minimal impact on the operational database has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for updating a target table of a data mart in response to changes made by a transaction to data stored in a source table of an operational database, comprising the steps of:

determining data that was changed in the source table by the transaction;

storing the data that was changed in a first table of a dedicated databases, wherein the dedicated database is separate from the operational database;

determining data that was not changed in the source table by the transaction and which is being mapped to the target table;

storing data that was not changed in a second table of the dedicated database;

propagating the data that was changed from the first table of the dedicated database and the data that was not changed from the second table of the dedicated database to a transformation process, wherein the transformation process transforms the data without impacting the operational database;

storing transformed data in the target table of the data mart.

2. The method of claim 1 further comprising the steps of:

designating a first source table as being a primary source table, wherein changes made to the primary source table are stored in the first table of the dedicated database;

designating a second source table as being a non-primary source table, wherein data that was not changed in the source table of the operational database is stored in the second table of the dedicated database;

mapping the primary source table and the non-primary source table to the target table.

3. The method of claim 2 further comprising the steps of:

copying changes made upon the first table to the second table;

storing data from the second source table to the second table of the dedicated database.

4. The method of claim 1 further comprising the step of truncating the first table and the second table after the data has been propagated from the first table and the second table to the target table.

5. The method of claim 4 further comprising the step of assigning internal transaction identifications which are used to determine points at which the first table and the second table are to be truncated.

6. The method of claim 1 further comprising the step of ensuring that data associated only with committed transactions are propagated to the target table.

7. The method of claim 1 further comprising the step of storing a transaction table in the dedicated database, wherein the transaction table includes information corresponding to a transaction, identification of the transaction, identifications of a first log record and a last log record corresponding to the transaction, and a state of the transaction.

8. The method of claim 7 further comprising the step of storing a log record table in the dedicated database, wherein the log record table includes an identification of the operational database, an identification of the source table, and an identification of the first table corresponding to the source table.

9. The method of claim 1 further comprising the step of storing an in-memory queue of in-flight transactions, wherein the in-memory queue is consulted to determine whether a table modified by a transaction has already been modified by the transaction.

10. An apparatus for updating changes made upon an operational database to data marts, comprising:

a storage device for storing the operational database;

a client computer coupled to the operational database for changing data corresponding to a source table of the operational database;

a change capture database coupled to the client computer having a dynamic image table for storing the changes that were made to the source table and a static image table for storing historical data corresponding to the source table, wherein the change capture database is separate from the operational database;

a capture process for capturing changes made to the source table and staging the changes to the dynamic image table;

a builder process for ensuring that the historical data is present in the static image table, wherein if the historical data is not present, the builder process reads the historical data from the source table and stores the historical data in the static image table;

a transaction process for extracting the data from the change capture database, transforming the data, and loading the data to the data marts without impacting the operational database.

11. The apparatus of claim 10 further comprising a mapping table used to map source tables to target tables, wherein a user specifies a primary source table for a particular target table and all other source tables mapped to that particular target table are designated as being non-primary sources.

12. The apparatus of claim 11, wherein the builder process copies changes made upon the dynamic table to the static image table.

13. The apparatus of claim 11 further comprising a truncator process for truncating the dynamic image table and the static image table after the data has been propagated to the data marts.

14. The apparatus of claim 13, wherein internal transaction identifications are assigned to each record of the dynamic image table and static image table which are used to determine points at which the dynamic image table and the static image table are to be truncated.

15. The apparatus of claim 10, wherein the builder process ensures that data associated only with committed transactions are propagated to a target table of one of the data marts.

16. The apparatus of claim 10, wherein a transaction table is stored in the change capture database, the transaction table includes information corresponding to a transaction, identification of the transaction, identifications of a first log record and a last log record corresponding to the transaction, and a state of the transaction.

17. The apparatus of claim 16, wherein a log record table is stored in the change capture database, the log record table includes an identification of the operational database, an identification of the source table, and an identification of a first table corresponding to the source table.

18. The apparatus of claim 17, wherein an in-memory queue of in-flight transactions is consulted to determine whether a table modified by a transaction has already been modified by the transaction.

* * * * *